US009452530B2

(12) United States Patent
Sisbot et al.

(10) Patent No.: US 9,452,530 B2
(45) Date of Patent: Sep. 27, 2016

(54) ROBOT MOTION REPLANNING BASED ON USER MOTION

(71) Applicant: TOYOTA JIDOSHA KABUSHIKI KAISHA, Toyota-shi, Aichi-ken (JP)

(72) Inventors: Emrah Akin Sisbot, Mountain View, CA (US); Young-Ho Kim, College Station, TX (US)

(*) Notice: Subject to any disclaimer, the term of this patent is extended or adjusted under 35 U.S.C. 154(b) by 110 days.

(21) Appl. No.: 14/485,491

(22) Filed: Sep. 12, 2014

(65) Prior Publication Data

US 2016/0075023 A1 Mar. 17, 2016

(51) Int. Cl.
| | |
|---|---|
| G05B 19/04 | (2006.01) |
| G05B 19/18 | (2006.01) |
| B25J 9/16 | (2006.01) |
| G06T 7/20 | (2006.01) |
| G06T 7/00 | (2006.01) |
| G06K 9/52 | (2006.01) |
| G06K 9/00 | (2006.01) |

(52) U.S. Cl.
CPC .......... *B25J 9/1666* (2013.01); *G06K 9/00348* (2013.01); *G06K 9/00671* (2013.01); *G06K 9/52* (2013.01); *G06T 7/004* (2013.01); *G06T 7/20* (2013.01); *G05B 2219/40476* (2013.01)

(58) Field of Classification Search
CPC ........ G05D 1/02; G05D 1/024; G05D 1/028; G05D 1/0238; G05D 1/0214; G05D 1/102; B62D 1/28; G05B 13/02
See application file for complete search history.

(56) References Cited

U.S. PATENT DOCUMENTS

| | | | | |
|---|---|---|---|---|
| 5,006,988 A | * | 4/1991 | Borenstein | G05D 1/0255 180/169 |
| 5,687,136 A | * | 11/1997 | Borenstein | A61H 3/061 367/116 |
| 6,671,226 B1 | * | 12/2003 | Finkel | A61H 3/061 367/116 |
| 7,957,901 B2 | * | 6/2011 | Shin | G01S 15/025 367/118 |
| 2007/0027579 A1 | * | 2/2007 | Suzuki | G05D 1/0251 700/245 |
| 2008/0033649 A1 | * | 2/2008 | Hasegawa | G06K 9/4619 701/301 |
| 2009/0043440 A1 | | 2/2009 | Matsukawa et al. | |
| 2009/0052740 A1 | * | 2/2009 | Sonoura | G06K 9/32 382/103 |

(Continued)

OTHER PUBLICATIONS

Sisbot, E.A., Marin-Urias, L.F., Alami, R., Simeon, T. (2007) A Human Aware Mobile Robot Motion Planner. University of Toulouise, 10 pgs.

(Continued)

*Primary Examiner* — Jerrah Edwards
*Assistant Examiner* — Rachid Bendidi
(74) *Attorney, Agent, or Firm* — Burbage Law, P.C.; Jon-Michael Burbage; Elizabeth Ruzich (57) ABSTRACT

The disclosure includes a system and method for determining a robot path based on user motion by determining a current position of a robot with a processor-based computing device programmed to perform the determining, receiving sensor readings on positions, directions, and velocities of a visually-impaired user and other users, generating a model of the motions of the visually-impaired user and the other users, the model including a user path for the visually-impaired user and a robot path for the robot, generating a collision prediction map to predict collisions between at least one of the robot, the visually-impaired user, and the other users, determining whether there is a risk of collision for either the visually-impaired user or the robot, and responsive to the risk of collision, updating at least one of the user path and the robot path.

20 Claims, 7 Drawing Sheets

(56) References Cited

U.S. PATENT DOCUMENTS

| | | | | |
|---|---|---|---|---|
| 2009/0234527 A1* | 9/2009 | Ichinose | | G05D 1/024 701/23 |
| 2009/0326713 A1* | 12/2009 | Moriya | | A63H 17/00 700/255 |
| 2010/0324771 A1* | 12/2010 | Yabushita | | G05D 1/024 701/25 |
| 2011/0091074 A1* | 4/2011 | Nobori | | G06T 7/2006 382/103 |
| 2014/0009561 A1* | 1/2014 | Sutherland | | B25J 5/007 348/14.05 |

OTHER PUBLICATIONS

Kruse, T., Kirsch, A., Sisbot, E.A., Alami, R. (2010) Dynamic Generation and Execution of Human Aware Navigation Plans. International Foundation for Autonomous Agents and Multiagent Systems, 3 pgs.

Pacchierotti, E., Christensen, H.I., Jensfelt, P. (2006) Embodied Social Interaction for Service Robots in Hallway Environments. Centre for Autonomous Systems, Swedish Royal Institute of Technology, 12 pgs.

* cited by examiner

ROBOT MOTION REPLANNING BASED ON USER MOTION

BACKGROUND

The specification relates to determining a robot path based on user motion.

Visually-impaired people have difficulty walking around in public spaces, such as a shopping mall or a pedestrian walkway, because it is difficult to navigate spaces with other people. For example, people with full sight can consider the direction and velocity of other people and avoid colliding with them. Visually-impaired people, however, lack this information.

Existing solutions involve systems for avoiding obstacles that assume that the obstacles all move with a consistent velocity. This is inaccurate and can lead to collisions with the visually-impaired user.

SUMMARY

According to one innovative aspect of the subject matter described in this disclosure, a system for using a robot to simulate user motions is described. The system includes a processor and a tangible, non-transitory memory storing instructions that, when executed, cause the system to: determine a current position of a robot, receive sensor readings on positions, directions, and velocities of a visually-impaired user and other users, generate a model of the motions of the visually-impaired user and the other users, the model including a user path for the visually-impaired user and a robot path for the robot, generate a collision prediction map to predict collisions between at least one of the robot, the visually-impaired user, and the other users, determine whether there is a risk of collision for either the visually-impaired user or the robot, and responsive to the risk of collision, update at least one of the user path and the robot path.

In general, another innovative aspect of the subject matter described in this disclosure may be embodied in methods that include determining a current position of a robot with a processor-based computing device programmed to perform the determining, receiving sensor readings on positions, directions, and velocities of a visually-impaired user and other users, generating a model of the motions of the visually-impaired user and the other users, the model including a user path for the visually-impaired user and a robot path for the robot, generating a collision prediction map to predict collisions between at least one of the robot, the visually-impaired user, and the other users, determining whether there is a risk of collision for either the visually-impaired user or the robot, and responsive to the risk of collision, updating at least one of the user path and the robot path.

Other aspects include corresponding methods, systems, apparatus, and computer program products for these and other innovative aspects.

These and other embodiments may each optionally include one or more of the following operations and features. For instance, the operations include: responsive to an absence of the risk of collision, providing directions to the visually-impaired user based on the user path; and instructing the robot to follow the robot path and providing directions of the visually-impaired user based on the user path. For instance, the features include generating the model of the motions further comprising receiving torso-directed movement data for each user, determining the face direction for each user, determining the walking direction for each user, determining whether each user exhibits low-consistency movement or high-consistency movement based on the torso direction and the walking direction, and determining human motion uncertainty based on the consistency of movement; comprising using a probabilistic method to estimate the degree of human reaction by updating each variant scale parameter between a torso direction and current movement; generating the collision prediction map further comprising generating pairs between the visually-impaired user and each of the other users, determining a difference of arrival time between members of each pair, and determining whether the difference of arrival time is less than a boundary parameter; responsive to the difference of arrival time being less than the boundary parameter, further comprising increasing a collision probability and generating the collision map based on the collision probability for each pair; responsive to the difference of arrival time being greater than the boundary parameter, further comprising setting the collision probability to zero, and generating the collision map based on the collision probability for each pair.

Throughout the disclosure, the term "data" may be used to represent any digital data undergoing the transfer functions or operations described herein. The digital data may include, but is not limited to, network services data, connectivity map data, journey data, user profile data, time synchronicity data, historical journey data, preference hierarchy data, dead zone data, navigation map data, mesh network data, velocity data, data to be shared between two or more entities (e.g., servers, vehicle systems, mobile client devices, client devices, etc.), and data to be transferred between two or more entities.

The disclosure is particularly advantageous in a number of respects. For example, the system is more accurate and results in fewer collisions. In addition, the robot makes people more comfortable and trusting of the robot. Yet another advantage is that the system allows visually-impaired users access to a greater variety of locations.

The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
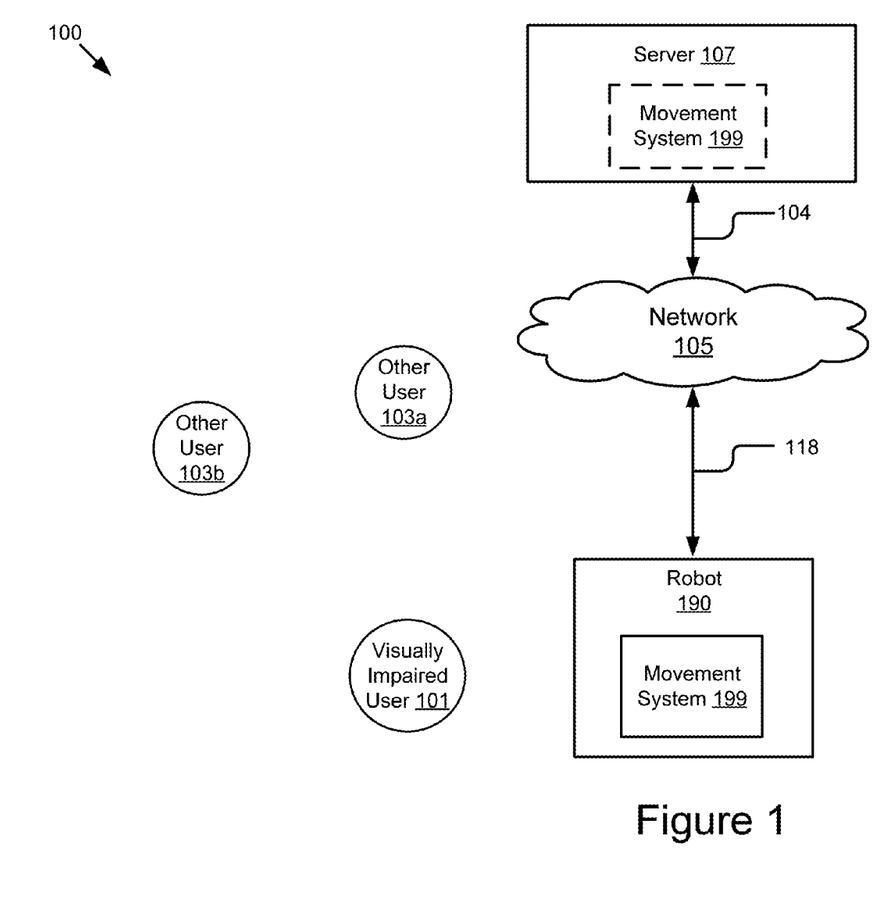
FIG. 1 is a block diagram illustrating an example system for determining a robot path based on user motion.

FIG. 1 illustrates a block diagram of some embodiments of a system 100 for determining a robot path based on user motion. The system 100 includes a server 107 communicatively coupled to a network 105 via a signal line 104, a robot 190 communicatively coupled to the network 105 via a signal line 118, a visually-impaired user 101, and other users 103a, 103b.

While FIG. 1 illustrates one visually-impaired user 101, one server 107, and one robot 190, the disclosure applies to a system architecture including one or more visually-impaired users 101, one or more servers 107, and one or more robots 190. Furthermore, although FIG. 1 illustrates one network 105 coupled to the entities of the system 100, in practice one or more networks 105 of various types may be connected to these entities. While FIG. 1 illustrates two other users 103a, 103b, only one or more than two users 103 are possible.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the robot 190. The network 105 may be a mobile data network, for example, 3G, 4G, LTE, Voice-over-LTE ("VoLTE"), or any other mobile data network or combination of mobile data networks. In some embodiments, the network 105 may be a combination of different networks.

The robot 190 may be computing device that includes a memory and a processor, for example, a laptop computer, a desktop computer, a tablet computer, a mobile telephone, a personal digital assistant ("PDA"), a mobile e-mail device, a portable game player, a portable music player, a connected device or wearable computer (e.g., a smart watch, smart glasses, fitness tracker, etc.), a television with one or more processors embedded therein or coupled thereto, a vehicle, or other electronic device capable of accessing the network 105. The robot 190 includes a movement system 199 for determining a robot path based on user motion.

The robot 190 may include functionality to enable a user to consume network services. The network services may include any service accessible via the network 105. For example, the network services include navigation instructions, streaming audio or video (such as Pandora™, Spotify™, iTunes™, Google Play™, YouTube™, etc), social networking (such as Facebook™, Google+™, LinkedIn™, Tinder™, QQ™, etc.), microblogging (such as Twitter™, Tumblr™, etc.), online chatting (such as SnapChat™, WhatsApp™, etc.), online content sharing (such as Instagram™, Pinterest™, etc.), email (such as Gmail™, Outlook™, Yahoo Mail™, etc.), file sharing (such as DropBox™, Google Drive™, MS One Drive™, Evernote™, etc), calendar and scheduling (such as Google™ Calendar, MS Outlook™, etc.), etc.

In some embodiments, the movement system 199 is also stored on a server 107. The movement system 199 is depicted with dashed lines in FIG. 1 in order to indicate that the movement system 199 is optionally stored on the server 107. The server 107 includes a memory and a processor. In one embodiment, the movement system 199 is stored in part on the robot 190 and in part on the server 107. For example, the robot 190 transmits information about the robot's 190 position to the server 107, which calculates the robot path and revises the robot path if applicable and transmits the path instructions back to the robot 190.

The movement system 199 may include code and routines for determining a robot path based on user motion associated with a visually-impaired user 101 and other users 103. The visually-impaired user 101 may be blind, have temporary vision loss, or another condition that results in impaired vision. The movement system 199 determines a current position of a robot and receives sensor readings on positions, directions, and velocities of a visually-impaired user and other users. The movement system 199 generates a model of the motions of the visually-impaired user and the other users, the model including a user path for the visually-impaired user and a robot path for the robot. The model takes into account the fact that the movement of the other users may be more or less predictable depending on how they walk. For example, users that swing their hips while they walk move in a less predictable direction.

The movement system 199 generates a collision prediction map to predict collisions between at least one of the robot, the visually-impaired user, and the other users. The collision prediction map is based on the model of the motions of the visually-impaired users. For example, users that display low-consistency movement because they swing their hips will be associated with more uncertain movement. As a result, the movement system 199 determines that there is a higher risk of collision because their movements are not as predictable. The movement system 199 determines whether there is a risk of collision for either the visually-impaired user or the robot. If there is a risk of collision, the movement system 199 updates at least one of the user path and the robot path.

In some embodiments, the movement system 199 can be implemented using hardware including a field-programmable gate array ("FPGA") or an application-specific integrated circuit ("ASIC"). In some other embodiments, the movement system 199 can be implemented using a combination of hardware and software. The movement system 199 may be stored in a combination of the devices and servers, or in one of the devices or servers.

Example Movement System

Figure 2:
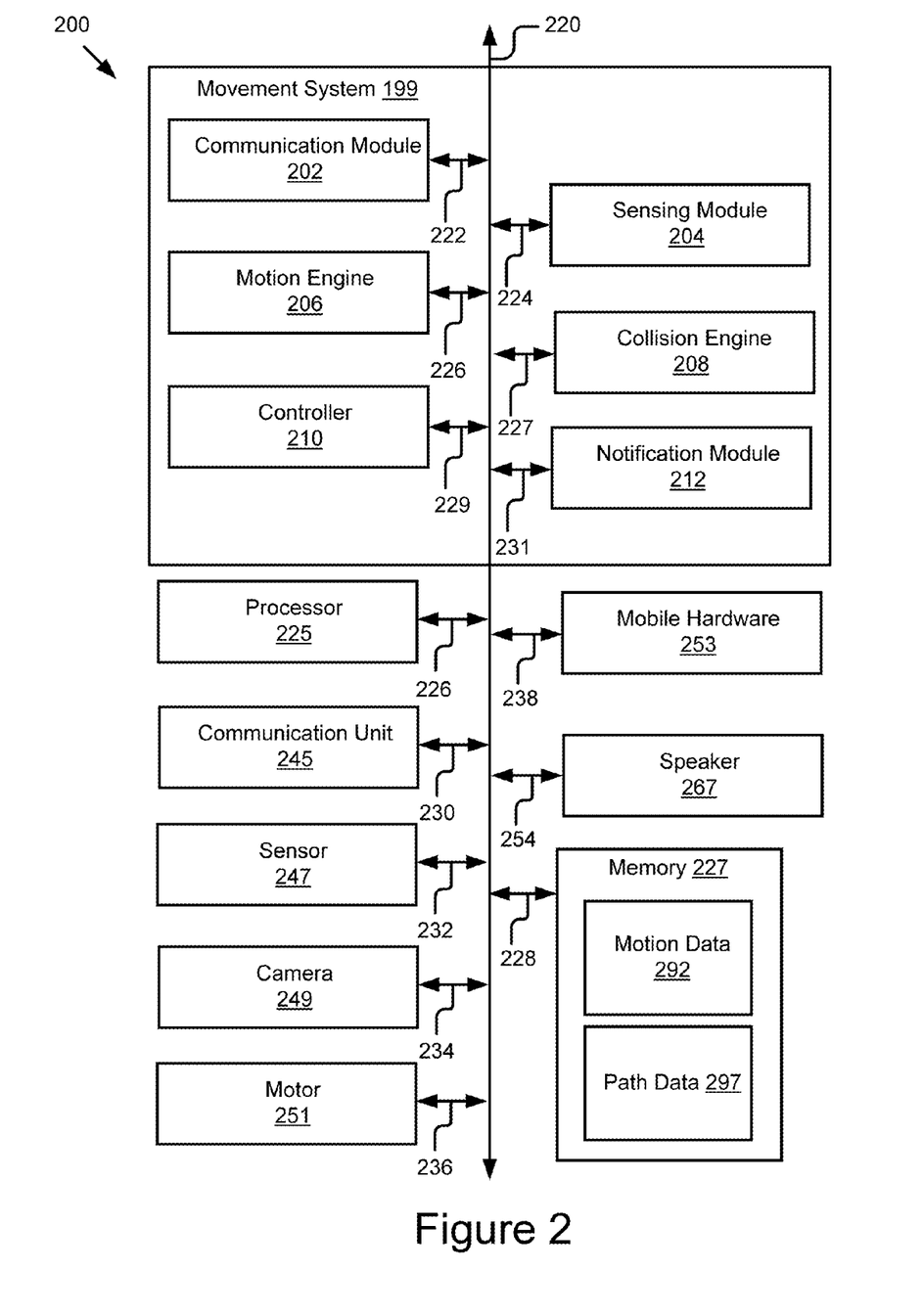
FIG. 2 is a block diagram illustrating an example movement system.

Referring now to FIG. 2, an example of the movement system 199 is shown in more detail. FIG. 2 is a block diagram of a system 200. The system 200 may be the robot 190 or the server 107 in the system 100 illustrated in FIG. 1. The system 200 may include the movement system 199, a processor 225, a memory, a communication unit 245, a sensor 247, a camera 249, a motor 251, mobile hardware 253, and a speaker 267 according to some examples. The components of the system 200 are communicatively coupled by a bus 220.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 226. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 228. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores motion data 292 and path data 297. The memory 227 may also store other data for providing the functionality described herein.

The motion data 292 may include, but are not limited to, data describing the positions, directions, and velocities of the visually-impaired user 101, other users 103, and the robot 190. For example, the motion data 292 may include the position information and torso-directed movement data determined by the sensing module 204. The motion data 292 may include a model of the motions of the visually-impaired user and the other user as generated by the motion engine 206. The motion data 282 may also include the collision prediction map generated by the collision engine 208.

The path data 297 may include a user path for the visually-impaired user 101 and a robot path for the robot 190. The path data 297 may also include revisions to the user path and the robot path that are made in response to the collision engine 208 generating the collision prediction map and identifying potential collisions.

The communication unit 245 transmits and receives data to and from at least one of the server 107 and the robot 190 in the system 100. The communication unit 245 is coupled to the bus 220 via a signal line 230. In some embodiments, the communication unit 245 includes a port for direct physical connection to the network 105 or to another communication channel. For example, the communication unit 245 includes a USB, SD, CAT-5, or similar port for wired communication with other entities in the system 100. In some embodiments, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

In the illustrated implementation shown in FIG. 2, the movement system 199 includes a communication module 202, a sensing module 204, a motion engine 206, a collision engine 208, a controller 210, and a notification module 212. These modules of the movement system 199 are communicatively coupled to each other via the bus 220.

In some embodiments, modules of the movement system 199 can be stored in a single server or device. In some other embodiments, modules of the movement system 199 can be distributed and stored across multiple servers or devices. Furthermore, the separation of various components, modules, and servers in the embodiments described herein should not be understood as requiring such separation in all embodiments. In some embodiments, the described components, modules, devices, or servers can generally be integrated together in a single component, module, device, or server.

The sensor 247 is any device that senses physical changes. The sensor 247 is coupled to the bus 220 via signal line 232. In one embodiment, the sensor 247 is a motion detector. For example, the sensor 247 is a gyroscope that measures orientation of the robot 190. In another example, the sensor 247 is an accelerometer that is used to measure acceleration of the robot 190. In yet another example, the sensor 247 includes location detection, such as a global positioning system (GPS), location detection through triangulation via a wireless network, etc. In some embodiments, the sensor 247 transmits the location information to the sensing module 204 via the communication module 202. In some embodiments, the sensor 247 transmits the location information to the motion engine 206, the collision engine 208, or the controller 210 via the communication module 202. In other embodiments, the sensor 247 stores the location information as part of the motion data 292 in the memory 227.

In some embodiments, the sensor 247 may include a depth sensor. In some embodiments, the depth sensor determines depth using structured light, such as a speckle pattern of infrared laser light. In another embodiment, the depth sensor determines depth using time-of-flight technology that determines depth based on the time it takes a light signal to travel between the camera and an object. For example, the depth sensor is a laser rangefinder. The depth sensor may be used to identify drops and the dimensions of the drops including their depth. In some embodiments, the sensor 247 transmits the depth information to the sensing module 204 for identifying the position of the visually-impaired user 101, the other users 103, and the robot 190, the motion engine 206 for determining whether the visually-impaired user 101 and the other users 103 have low-consistency or high-consistency movement, the collision engine 208 for identifying potential collisions between user couples, or the controller 210 for generating instructions for the robot to follow the robot path. In other embodiments, the sensor 247 stores the depth information as part of the motion data 292 in the memory 227.

In one embodiment, the sensor 247 includes a microphone for converting sound into electrical signals. The microphone may receive instructions from a visually-impaired user 101 for fulfilling a request, such as providing directions to the visually-impaired user 101. The microphone transmits the electrical signals to the movement system 199 for processing of the instructions.

The camera 249 is a physical device for capturing images that is coupled to the bus 220 via signal line 234. In one embodiment, the camera 249 captures electronic images. The camera 249 includes an image sensor, such as a charge-coupled device (CCD) or a complementary metal-oxide semiconductor (CMOS) for converting an optical image to electrical signals. In one embodiment, the camera 249 sends the electrical signals to the sensing module 204 for identifying the position of the visually-impaired user 101, the other users 103, and the robot 190, the motion engine 206 for determining whether the visually-impaired user 101 and the other users 103 have low-consistency or high-consistency movement, the collision engine 208 for identifying potential collisions between user couples, or the controller 210 for generating instructions for the robot to follow the robot path. In another embodiment, the camera 249 stores the electrical signals in the memory 227 as part of the motion data 292.

In embodiments where the system 200 is a robot 190, the system 200 includes a motor 251 and mobile hardware 253. The motor 251 is coupled to the bus 220 via signal line 236. The mobile hardware 253 is coupled to the bus 220 via signal line 238. The motor 251 includes hardware for powering the mobile hardware 253. The mobile hardware 253 includes hardware for moving the robot 190, such as wheels. The motor 251 and the mobile hardware 253 are used to move the robot 190. For example, the collision engine 208 instructs the motor 251 to drive the mobile hardware 253 to reposition the robot 190 between the user and the risk.

The speaker 267 is optional hardware for generating audible directions that is coupled to the bus 220 via signal line 254. For example, where the system 200 is a robot 190, the speaker 267 receives instructions from the notification module 212 to provide directions to the visually-impaired user 101.

In some embodiments, each of the modules 202, 204, 206, 208, 210, and 212 in the movement system 199 can be a set of instructions executable by the processor 225 to provide the functionality described below. In some other embodiments, each of the modules 202, 204, 206, 208, 210, and 212 can be stored in the memory 227 and can be accessible and executable by the processor 225 of the system. Each of the modules 202, 204, 206, 208, 210, and 212 may be adapted for cooperation and communication with the processor 225 and other components of the system 200. In some embodiments, each of the modules 202, 204, 206, 208, 210, and 212 may be adapted to function as one or more thin clients that are stored and executed by a processor of the system 200.

The communication module 202 can be software including routines for handling communications between the movement system 199 and other components of the system 200. In some embodiments, the communication module 202 can be a set of instructions executable by the processor 225 to provide the functionality described below for handling communications. The communication module 202 may be communicatively coupled to the bus 220 via signal line 222.

The communication module 202 sends and receives data, via the communication unit 245, to and from one or more of the server 107 and the robots 190. For example, the communication module 202 receives, via the communication unit 245, a determination that the visually-impaired user 101 will collide with another user 103 if the user path is not modified.

In some embodiments, the communication module 202 receives data from components of the movement system 199 and stores the data in the memory 227. In some embodiments, the communication module 202 retrieves data from the memory 227 and sends the data to one or more components of the movement system 199. In some embodiments, the communication module 202 may handle communications between components of the movement system 199. For example, the communication module 202 receives data from one module and sends the data to another module.

The sensing module 204 can be software including routines for determining a current position of a robot 402 and receiving sensor readings on positions, directions, and velocities of a visually-impaired user 101 and other users 103. In some embodiments, the sensing module 204 can be a set of instructions executable by the processor 225 to provide the functionality described below for sensing users and robots 190. The sensing module 204 may be communicatively coupled to the bus 220 via signal line 224.

In some embodiments, the sensing module 204 receives images from the camera 249 via the communication module 202. The sensing module 204 identifies the location and orientation of the user from the images. The location may be expressed as longitude and latitude coordinates, according to a Cartesian coordinate system, etc. The sensing module 204 may determine the orientation of the user by identifying the direction of the user's torso and from that direction, determining the direction of the user's face. The sensing module 204 also uses the images from the camera 249 to identify torso-directed movement data, which includes the direction of the user's torso as a function of time by comparing the direction in successive images. The motion engine 206 uses the direction of the user's torso over time to categorize the type of torso-directed movement.

The sensing module 204 determines a current position of the robot 190. For example, the sensing module 204 uses a sensor 247 that is part of the robot 190 to determine the robot's 190 location, such as GPS, triangulating signals using WiFi, etc. In another example, the sensing module 204 determines the current position of the robot 190 by receiving images from the camera 249 and comparing the location of known objects in the images to the robot 190.

The motion engine 206 can be software including routines for generating a model of the motions of the users. In some embodiments, the motion engine 206 can be a set of instructions executable by the processor 225 to provide the functionality described below for generating a model of the motions. The motion engine 206 may be communicatively coupled to the bus 220 via signal line 226.

In some embodiments, the motion engine 206 generates a user path for the visually-impaired user 101 and a robot path for the robot 190. In some embodiments, the user path and the robot path are the same path but adjusted based on the distance between the visually-impaired user 101 and the robot 190. For example, the robot 190 traverses the path five feet ahead of the visually-impaired user 101 to protect the visually-impaired user 101 from any harm.

The user path may be determined by information from the visually-impaired user 101. For example, the visually-impaired user may speak a request at the robot 190 to provide directions to get to a destination that are received by a sensor 247 functioning as a microphone. The motion engine 206 may include a sub-component for converting speech-to-text to translate the user request into machine-understandable language and generate directions accordingly. In another embodiment, the motion engine 206 determines the user path based on the behavior of the visually-impaired user 101. For example, if the visually-impaired user 101 takes the same path each day at 8 a.m. Monday through Friday, the motion engine 206 generates the same user path at that time.

The motion engine 206 generates a model of the motions of the visually-impaired user 101 and the other users 103. In some embodiments, the motion engine 206 generates the model by receiving torso-directed movement data for each user. The torso-directed movement data may come from the sensing module 204 via the communication module 202 or the motion engine 206 retrieves it as part of the motion data 292 from the memory 227. The motion engine 206 determines the face direction for each user based on the torso-directed movement. From the face direction, the motion engine 206 determines the walking direction for each user.

The motion engine 206 determines whether each user exhibits low-consistency movement or high-consistency movement based on the torso direction and the walking direction. People who have a low-consistency movement walk with a slight swing to their hips. Low-consistency movement corresponds to more uncertainty of movement because it is not clear which direction the user is heading. Conversely, people who display high-consistency movement often look like they are walking in a military march. High-consistency movement corresponds to less uncertainty of movement because the user is more likely to be walking in a direction that is perpendicular to the user's hips. In some embodiments, the motion engine 206 determines the user's walking direction by using a probabilistic method to estimate the degree of human reaction by updating each variant scale parameter between the torso direction and the current movement. For example, the motion engine 206 uses a Bayesian filter as the probabilistic method.

Figure 3A:
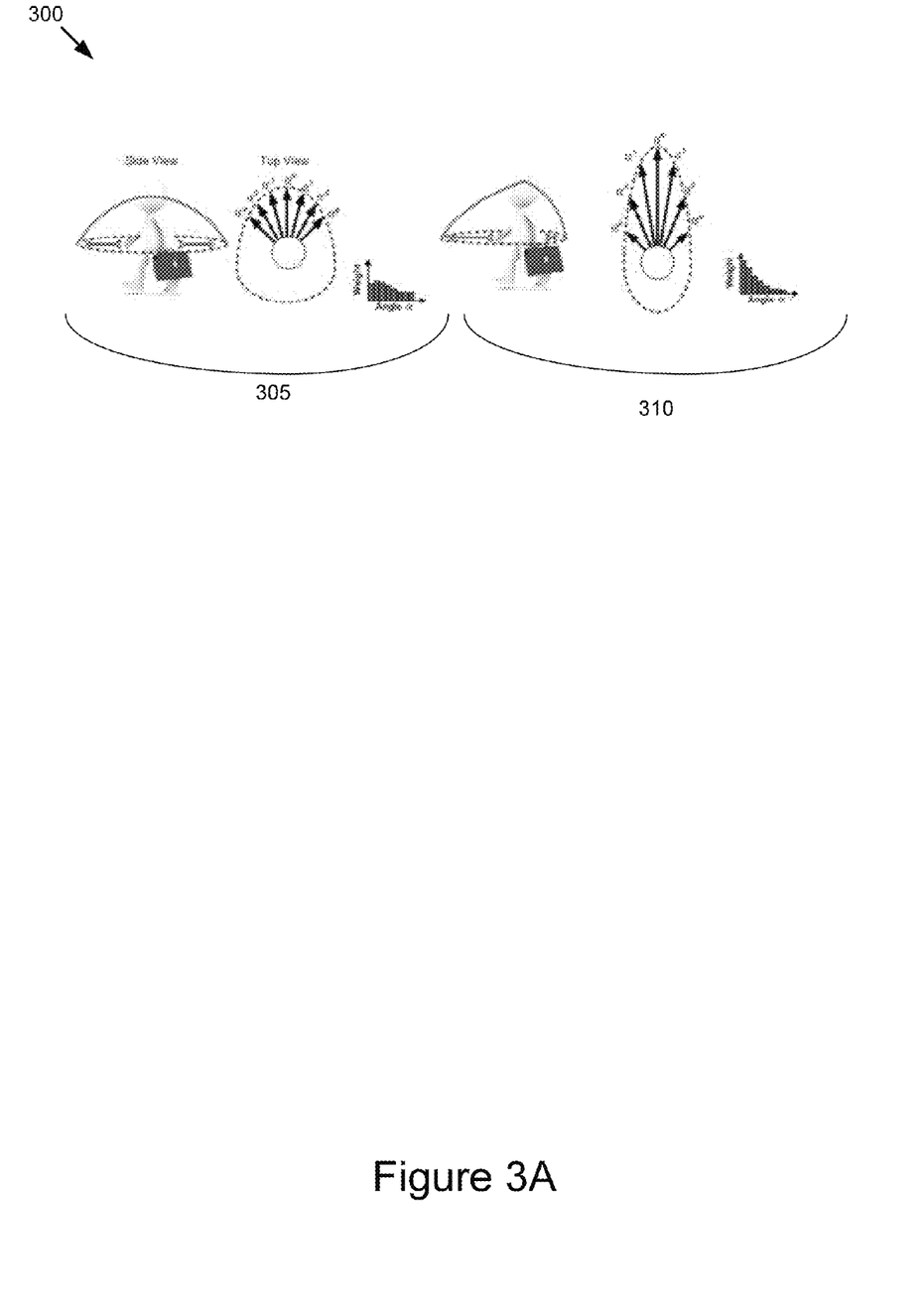
FIG. 3A is a graphic illustrating the predicted direction for users based on consistency of movement.

FIG. 3A illustrates a side view, a top view, and a graph 300 illustrating weight as a function of the user's angle from the torso for people with low-consistency movement 305 and people with high-consistency movement 310. The graph 300 demonstrates that users with low-consistency movement move in a less predictable direction than users with high-consistency movement.

The collision engine 208 can be software including routines for generating a collision prediction map, determining whether there is a risk of collision, and responsive to a risk of collision, updating a path. In some embodiments, the collision engine 208 can be a set of instructions executable by the processor 225 to provide the functionality described below for generating the new path. The collision engine 208 may be communicatively coupled to the bus 220 via a signal line 229.

In one embodiment, the collision engine 208 generates a collision prediction map by determining a risk of collision associated with each pair of users comprising the visually-impaired user 101 and one of the other users 103 and determining a collision probability for each of the pairs. In some embodiments, the collision engine 208 also generates a collision prediction map from pairs comprising the robot 190 and one of the other users 103 as well.

In some embodiments, the collision engine 208 generates pairs between the visually-impaired user and each of the other users. The collision engine 208 determines a difference of arrival time between members of each pair and determines whether the difference of arrival time is less than a boundary parameter. For example, the collision engine 208 defines $X_0$ as a goal position for the visually-impaired user 101 who is at $X_1$. Another user 103 is at $X_2$. The collision engine 208 determines an arrival time for the visually-impaired user 101 that is the time it takes the visually-impaired user 101 to walk from $X_1$ to $X_0$. For example, it takes 5.5 seconds. The collision engine 208 determines an arrival time for another user 103 to travel from $X_2$ to $X_0$. For example, it takes 5.25 seconds. The collision engine 208 determines whether the difference in arrival time is less than a boundary parameter. For example, where the boundary parameter is 0.5 seconds and the difference of arrival time is 0.25 seconds, 0.25 seconds is lower than the boundary parameter of 0.5. In this case, the collision engine 208 increases a collision probability.

If the difference of arrival time is greater than the boundary parameter, for example 1 second, the collision engine 208 determines decreases the collision probability to zero. For example, where the boundary parameter is 0.75 seconds and the arrival time difference is 1.5 seconds, the collision engine 208 sets the collision probability to zero since the time difference is higher than the boundary parameter value. Once the collision engine 208 iterates through the difference of arrival time for each of the pairs ($X_2 \ldots X_n$) to generate collision probabilities, the collision engine 208 generates the collision map based on each collision probability for each pair.

Figure 3B:
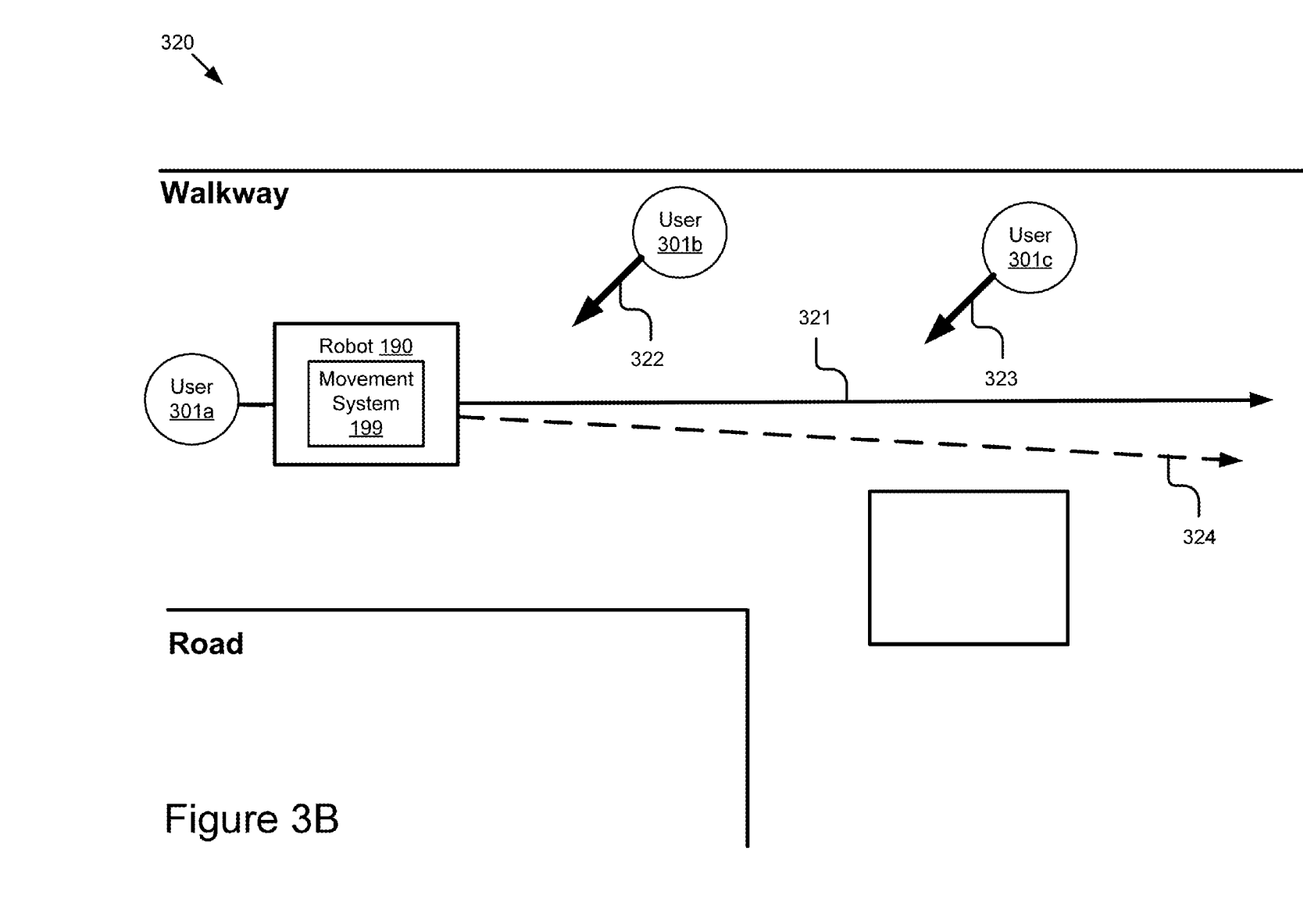
FIG. 3B is illustrates an example scenario where the path is modified based on user motion.

Turning now to FIG. 3B, an example scenario where the path is modified based on user motion is illustrated. The environment map 320 includes a visually-impaired user 301a, two other users 301b, 301c, and a robot 190. The user path 321 is a straight line. In this example, the robot path 190 is the same as the user path 321 except it's a few seconds ahead of the user path 321. The motion engine 206 generates a model of the motions of the visually-impaired user 301a and the other users 301b, 301c. In this example, the first other user 301b has a predicted motion vector 322 with a high-consistency of movement. The second other user 301c has a predicted motion vector 323 with a low-consistency of movement. The collision engine 208 generates a collision map that predicts that the first other user 301b has a collision probability of zero and the second other user 301c has a high increased collision probability. The high increased collision probability is a result of the second other user's 301c position and the uncertainty of movement associated with the second other user 301c. As a result, the collision engine 208 updates the user path as represented by the dashed line 324 to avoid colliding with the second other user 301c.

The controller 210 can be software including routines for instructing the robot 190 to follow the robot path. The controller 210 may be communicatively coupled to the bus 220 via signal line 229.

In some embodiments, the controller 210 may generate velocity constraints to follow the robot path as close as possible. For example, the controller 210 determines the direction and velocity for moving along the robot path. Once the controller 210 determines the velocity constraints, the controller 210 instructs the motor 251 to power the mobile hardware 253 to move the robot 190 along the robot path.

The notification module 212 can be software including routines for providing directions to the visually-impaired user based on the user path. In some embodiments, the notification module 212 can be a set of instructions executable by the processor 225 to provide the functionality described below for providing directions. The notification module 212 may be adapted for cooperation and communication with the processor 235 and other components of the computing device 200 via a signal line 231.

The notification module 212 receives the user path from the collision engine 208 or the notification module 212 retrieves the user path as part of the path data 297 from memory 227. The notification module 212 converts the code into human understandable sounds and transmits the notification to the speaker 267 via the communication module 202. In some embodiments, the notification module 212 provides additional notifications, such as warnings if the visually-impaired user 101 is about to collide with another user 103 or an object.

Example Methods

Figure 4:
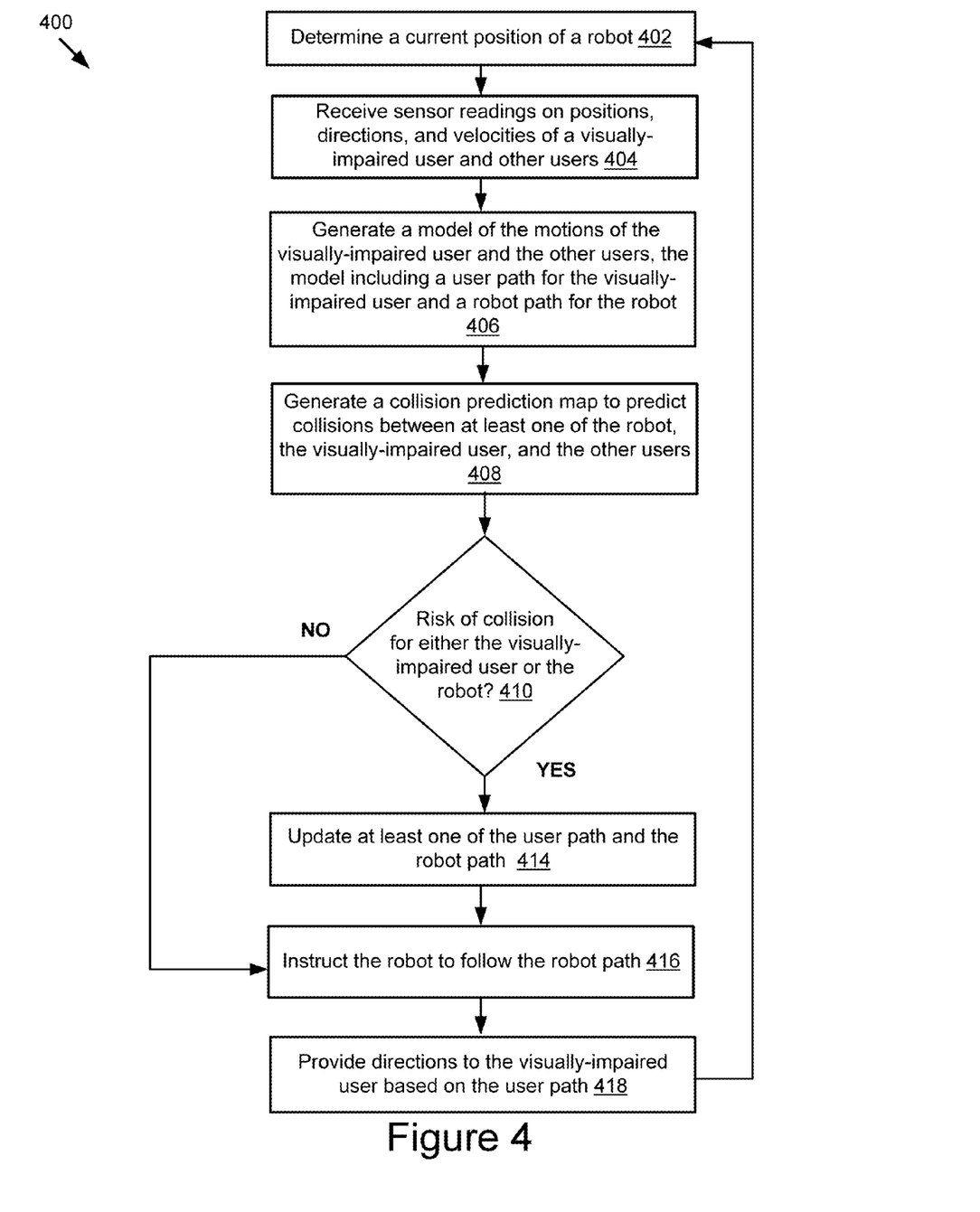
FIG. 4 is a flowchart of an example method for determining a robot path based on user motion.

Referring now to FIG. 4, an example of a method 400 for determining a robot path based on user motion is described. In some embodiments, the method 400 may be performed by modules of the movement system 199 stored on the server 107 or the robot 190. For example, the movement system 199 may include a sensing module 204, a motion engine 206, a collision engine 208, a controller 210, and a notification module 212.

The sensing module 204 determines 402 a current position of a robot 190. For example, the sensing module 204 uses GPS coordinates as determined by the sensor 247 to determine the current position of the robot. The sensing module 204 receives 404 sensor readings on positions, directions, and velocities of a visually-impaired user 101 and other users 103. For example, the sensing module 204 receives coordinate information from a sensor 247 or images from a camera 249 that the sensing module 204 uses to determine the positions, directions, and velocities of the users.

The motion engine 206 generates 406 a model of the motions of the visually-impaired user 101 and the other users 103, the model including a user path for the visually-impaired user and a robot path for the robot 190. The model may be an uncertainty model that is based on determining whether the users have low-consistency movement or high-consistency movement. The collision engine 208 generates 408 a collision prediction map to predict the collisions between at least one of the robot, the visually-impaired user, and the other users. For example, the collision engine 208 generates a collision prediction map based on pairs between the visually-impaired user 101 and each other user 103 and a difference of arrival time between the members of each pair. The collision engine 208 determines 410 whether there is a risk of collision for either the visually-impaired user or the robot. If there is a risk of collision, the collision engine 208 updates 414 at least one of the user path and the robot path and the controller 210 instructs 416 the robot 190 to follow the robot path. If there is not a risk of collision, the controller 210 instructs 416 the robot 190 to follow the robot path. The notification module 212 provides 418 directions to the visually-impaired user based on the user path. The method then begins again by determining the current position of the robot.

Figure 5:
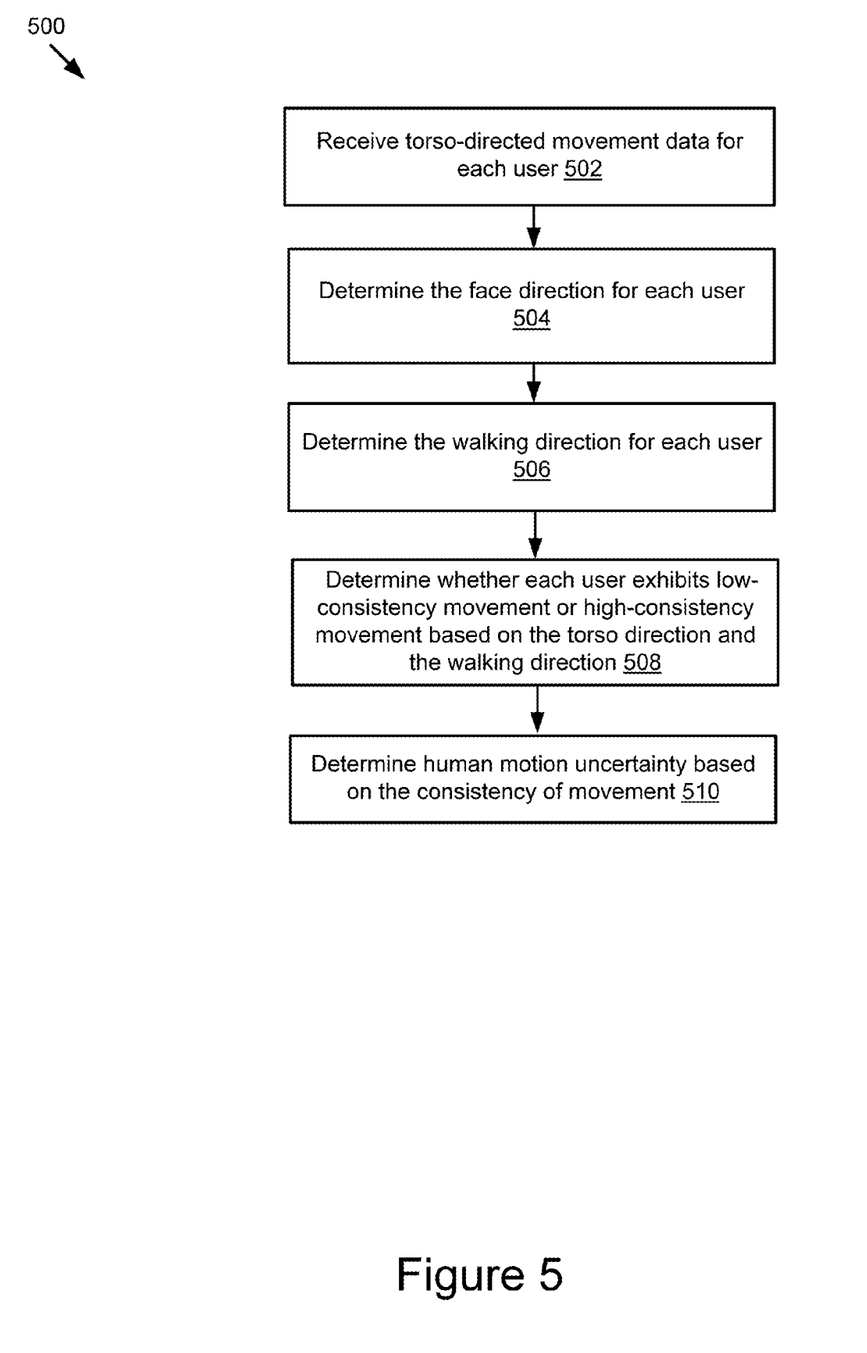
FIG. 5 is a flowchart of an example method for generating a model of motions.

FIG. 5 is a flowchart of an example method 500 for generating the model of the motions of the visually-impaired user and the other users. The motion engine 206 receives 502 torso-directed movement data for each user. For example, the motion engine 206 receives data about whether the user's hips swing or the user walks with more of a military march. The motion engine 206 determines 504 the face direction for each user. From the face direction, the motion engine 206 determines 506 the walking direction for each user. The motion engine 206 determines 508 whether each user exhibits low-consistency movement or high-consistency movement based on the torso direction and the walking direction. The motion engine 206 determines 510 human motion uncertainty based on the consistency of movement.

Figure 6:
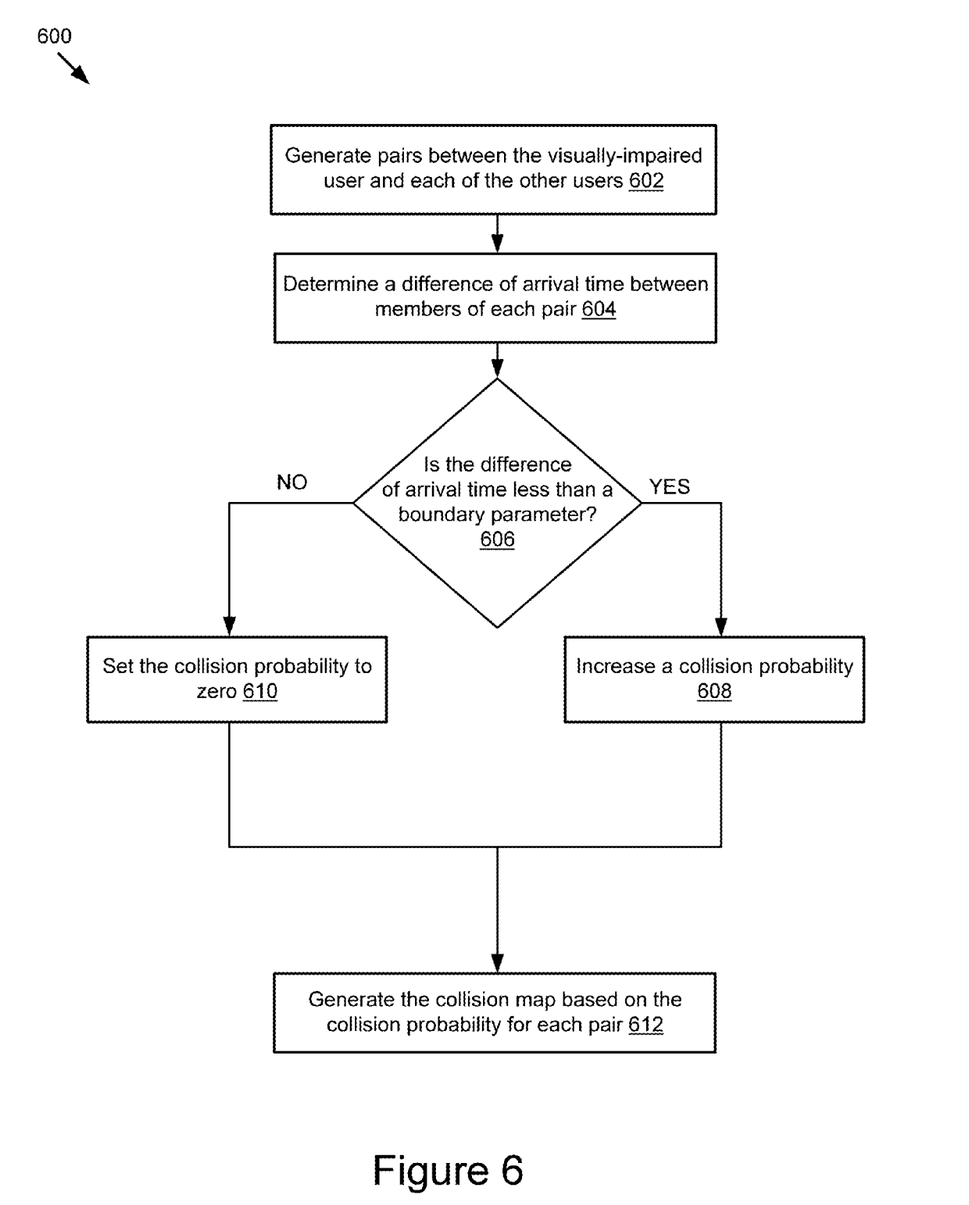
FIG. 6 is a flowchart of an example method for generating a collision prediction map.

FIG. 6 is a flowchart of an example method 600 for generating a collision map. The collision engine 208 generates 602 pairs between the visually-impaired user and each of the other users. The collision engine 208 determines 604 a difference of arrival time between members of each pair. For example, visually-impaired user 101 arrives at a specific location two seconds after another user 103. The collision engine 208 determines 606 whether the difference of arrival time is less than a boundary parameter. If the difference is less than the boundary parameter, the collision engine 208 increases 608 a collision probability. If the difference is greater than the boundary parameter, the collision engine 208 sets 610 the collision probability to zero. The collision engine 208 generates 612 the collision map based on the collision probability for each pair.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   determining a current position of a robot with a processor of the robot;
   receiving sensor readings on positions, directions, and velocities of a visually-impaired user and other users who are not visually-impaired in an environment where the visually-impaired user is known from the other users;
   generating a model of motions of the visually-impaired user and the other users, the model including a user path for the visually-impaired user and a robot path for the robot;
   generating a collision prediction map to predict collisions between at least one of the robot, the visually-impaired user, and the other users;
   determining whether there is a risk of collision for either the visually-impaired user or the robot; and
   responsive to the risk of collision, updating at least one of the user path and the robot path based on the risk of collision;
   wherein generating the model of the motions further comprises:
      receiving torso-directed movement data for the visually-impaired user;
      determining a face direction for the visually-impaired user;
      determining a walking direction for the visually-impaired user;
      determining whether the visually-impaired user exhibits low-consistency movement or high-consistency movement based on the torso direction and the walking direction; and
      determining human motion uncertainty based on the consistency of movement.

2. The method of claim 1, further comprising responsive to an absence of the risk of collision, providing directions to the visually-impaired user based on the user path.

3. The method of claim 1, further comprising:
   instructing the robot to follow the robot path with the processor; and
   providing directions of the visually-impaired user based on the user path.

4. The method of claim 1, wherein generating the model of the motions further comprises:

receiving torso-directed movement data for the other
users who are not visually-impaired;
determining the face direction for the other users;
determining the walking direction for the other users;
determining whether the other users exhibit low-consistency movement or high-consistency movement based on the torso direction and the walking direction of the other users; and
determining human motion uncertainty for the other users based on the consistency of movement of the other users.

5. The method of claim 1, further comprising using a probabilistic method to estimate a degree of human reaction by updating each variant scale parameter between a torso direction and current movement.

6. The method of claim 1, wherein generating the collision prediction map further comprises:
generating pairs between the visually-impaired user and each of the other users;
determining a difference of arrival time between members of each pair; and
determining whether the difference of arrival time is less than a boundary parameter.

7. The method of claim 6, wherein responsive to the difference of arrival time being less than the boundary parameter, further comprising:
increasing a collision probability; and
generating the collision map based on the collision probability for each pair.

8. The method of claim 6, wherein responsive to the difference of arrival time being less than the boundary parameter, further comprising:
setting a collision probability to zero; and
generating the collision map based on the collision probability for each pair.

9. A computer program product comprising a non-transitory computer-usable medium including a computer-readable program, wherein the computer-readable program when executed on a computer causes the computer to:
determine a current position of a robot;
receive sensor readings on positions, directions, and velocities of a visually-impaired user and other users in an environment where the visually-impaired user is known from the other users, wherein the other users are not visually-impaired;
generate a model of motions of the visually-impaired user and the other users, the model including a user path for the visually-impaired user and a robot path for the robot;
generate a collision prediction map to predict collisions between at least one of the robot, the visually-impaired user, and the other users;
determine whether there is a risk of collision for either the visually-impaired user or the robot; and
responsive to the risk of collision, update at least one of the user path and the robot path based on the risk of collision;
wherein generating the model of the motions further comprises:
receiving torso-directed movement data for the visually-impaired user;
determining a face direction for the visually-impaired user;
determining a walking direction for the visually-impaired user;
determining whether the visually-impaired user exhibits low-consistency movement or high-consistency movement based on the torso direction and the walking direction; and
determining human motion uncertainty based on the consistency of movement.

10. The computer program product of claim 9, wherein the computer-readable program is further configured to:
generate velocity constraints for the robot to follow a new path; and
instruct the robot to move to a goal position based on the new path and the velocity constraints.

11. The computer program product of claim 9, wherein the computer-readable program is further configured to:
instruct, by the computer, the robot to follow the robot path; and
provide directions of the visually-impaired user based on the user path.

12. The computer program product of claim 9, wherein generating the collision prediction map further comprises:
generating pairs between the visually-impaired user and each of the other users;
determining a difference of arrival time between members of each pair; and
determining whether the difference of arrival time is less than a boundary parameter.

13. The computer program product of claim 12, wherein the computer-readable program is further configured to use a probabilistic method to estimate a degree of human reaction by updating each variant scale parameter between a torso direction and current movement.

14. The computer program product of claim 9, wherein generating the model of motions further comprises:
receiving torso-directed movement data for the other users who are not visually-impaired;
determining the face direction for the other users;
determining the walking direction for the other users;
determining whether the other users exhibit low-consistency movement or high-consistency movement based on the torso direction and the walking direction of the other users; and
determining human motion uncertainty for the other users based on the consistency of movement of the other users.

15. A system comprising:
a processor; and
a non-transitory memory storing instructions that, when executed, cause the system to:
determine a current position of a robot;
receive sensor readings on positions, directions, and velocities of a visually-impaired user and other users in an environment where the visually-impaired user is known from the other users, wherein the other users are not visually-impaired;
generate a model of motions of the visually-impaired user and the other users, the model including a user path for the visually-impaired user and a robot path for the robot;
generate a collision prediction map to predict collisions between at least one of the robot, the visually-impaired user, and the other users;
determine whether there is a risk of collision for either the visually-impaired user or the robot; and
responsive to the risk of collision, update at least one of the user path and the robot path based on the risk of collision;

wherein generating the model of the motions further comprises:
    receiving torso-directed movement data for the visually-impaired user;
    determining a face direction for the visually-impaired user;
    determining a walking direction for the visually-impaired user;
    determining whether the visually-impaired user exhibits low-consistency movement or high-consistency movement based on the torso direction and the walking direction; and
    determining human motion uncertainty based on the consistency of movement.

16. The system of claim 15, wherein the memory stores instructions that, when executed, cause the system to providing directions to the visually-impaired user based on the user path responsive to an absence of the risk of collision.

17. The system of claim 15, wherein the memory stores instructions that, when executed, cause the system to:
    instruct, by the processor, the robot to follow the robot path; and
    provide directions of the visually-impaired user based on the user path.

18. The system of claim 15, wherein generating the model of the motions further comprises:
    receiving torso-directed movement data for the other users who are not visually-impaired;
    determining the face direction for the other users;
    determining the walking direction for the other users;
    determining whether the other users exhibit low-consistency movement or high-consistency movement based on the torso direction and the walking direction; and
    determining human motion uncertainty based on the consistency of movement.

19. The system of claim 18, wherein the memory is further configured to use a probabilistic method to estimate a degree of human reaction by updating each variant scale parameter between a torso direction and current movement.

20. The system of claim 15, wherein generating the collision prediction map further comprises:
    generating pairs between the visually-impaired user and each of the other users;
    determining a difference of arrival time between members of each pair; and
    determining whether the difference of arrival time is less than a boundary parameter.

* * * * *